United States Patent [19]

May

[11] Patent Number: 5,721,420

[45] Date of Patent: Feb. 24, 1998

[54] SHUTTER CONTROL MECHANISM

[75] Inventor: David C.C. May, Fife, Scotland

[73] Assignee: NCR Corporation, Dayton, Ohio

[21] Appl. No.: 644,015

[22] Filed: May 9, 1996

[30] Foreign Application Priority Data

Dec. 22, 1995 [GB] United Kingdom .................. 9526337

[51] Int. Cl.$^6$ ...................................................... G06F 17/60
[52] U.S. Cl. ............................................. 235/379; 902/31
[58] Field of Search ............................... 235/379; 902/31

[56] References Cited

U.S. PATENT DOCUMENTS 4,612,864  9/1986  Beck et al. ............................... 902/31

Primary Examiner—Harold Pitts
Attorney, Agent, or Firm—Michael Chan

[57] ABSTRACT

A shutter control mechanism for controlling the movement of a pivoted shutter (20) suitable for controlling the passage of a user's card (6) in a self-service terminal (10) such as an ATM (automated teller machine), for example, includes a rotatable cam (23) having a cam track (24) which cooperates with a pin (30) on the shutter (20). Rotation of the cam (23) causes the pin (30) to move in the cam track (24) thereby causing the shutter (20) to pivot to open and close the card passage (2) alternately. Thus, the shutter (20) is held positively both in the open and in the closed position.

5 Claims, 2 Drawing Sheets

SHUTTER CONTROL MECHANISM

BACKGROUND OF THE INVENTION

This invention relates to shutter control mechanisms of the kind for controlling the movement of a shutter between closed and open positions, which respectively close and open an aperture.

In one application, the aperture may, when the shutter is in the open position, permit passage of a data card of the kind used in automated teller machines (ATMs) such as are commonly provided for dispensing cash and for other financial transactions. When the shutter is in the closed position, the aperture is blocked and a data card or other object cannot be inserted into the aperture.

A known shutter mechanism used in an ATM includes a pivoted blade which is spring-biased to the shutter closed position, but may be pivoted to the shutter open position by a force provided by a solenoid, for example. The known shutter mechanism has the disadvantage that a potentially fraudulent person may force the shutter open from the exterior of the ATM, against the action of the spring urging the shutter closed. Furthermore, if a strong spring is provided to attempt to alleviate this problem, additional energy is required to be provided to overcome the force of the spring when the shutter is moved to the open position. Thus, a powerful electromagnetic device may need to be provided, for example.

SUMMARY OF THE INVENTION

It is an object of the present invention to provide a shutter control mechanism which is resistant to attempts to open the shutter in an unauthorised manner, yet has a low operative power requirement.

Therefore, according to the present invention, there is provided a shutter mechanism including a pivotally mounted shutter adapted to pivot about a support so that a blade portion of the shutter can move between open and closed positions wherein an aperture adapted for the passage of a data card is respectively open and closed, characterized in that a cam groove track on a rotatable cam wheel engages a pin on the shutter, the groove track having extreme near locations and extreme distant location relative to the axis of rotation of the cam wheel, such that movement of the shutter pin in the groove track causes the shutter to pivot about its support and be driven to and locked at corresponding open and shut positions of the shutter.

BRIEF DESCRIPTION OF THE DRAWINGS

One embodiment of the invention will now be described by way of example, with reference to the accompanying drawings, in which.

DETAILED DESCRIPTION

Figure 1:
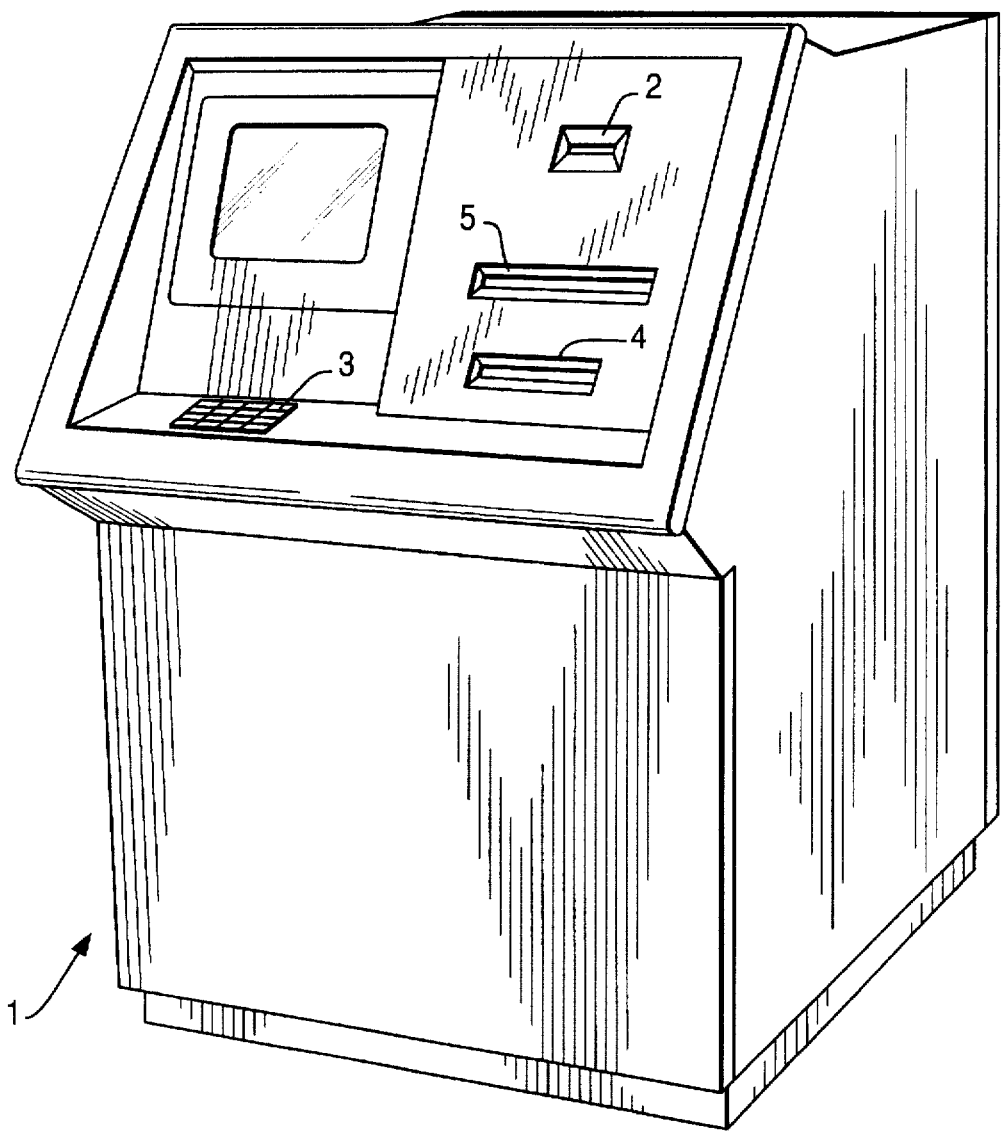
FIG. 1 shows a perspective view of an ATM having a card slot which may be closed or opened by a shutter.

Referring to FIG. 1, an ATM 1 has a card input slot 2 for receiving a data card, e.g. carrying identification and financial information of the card user in magnetically coded form, a key pad 3 for inputting data by the card user, a cash dispensing slot 4 and an output slot 5 for printed transaction and accounts data for the card user. The present invention concerns the shuttering of the input slot 2 so that unauthorised or unsuitable cards, and other undesirable objects are hindered from reaching the interior of the ATM 1 and the card reading station.

Figure 2:
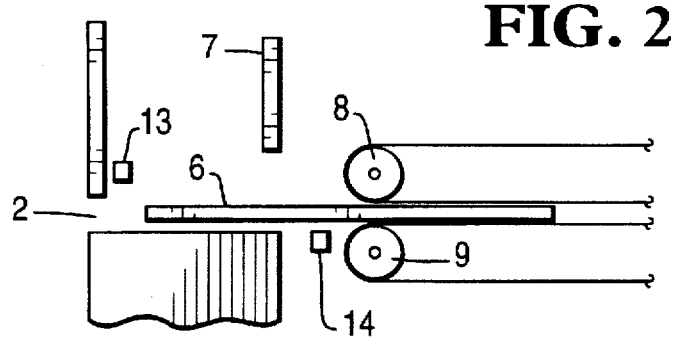
FIG. 2 shows a side view of the card slot, a shutter and a card en route to a checking or reading station.

Referring to FIG. 2 the slot 2 has received a card 6 and a shutter blade 7, in its raised, open position, permits passage of the card 6 to the nip between belts driven by driving rollers 8,9 so that the card is conveyed to a magnetic reading and writing station (not shown). The card 6 may be initially checked for the presence of a magnetic stripe by a sensor 13 which controls the raising of the shutter blade 7, and an optical sensor 14 may signal the passage of the leading edge of the card 2, to control further card processing functions.

Figure 3:
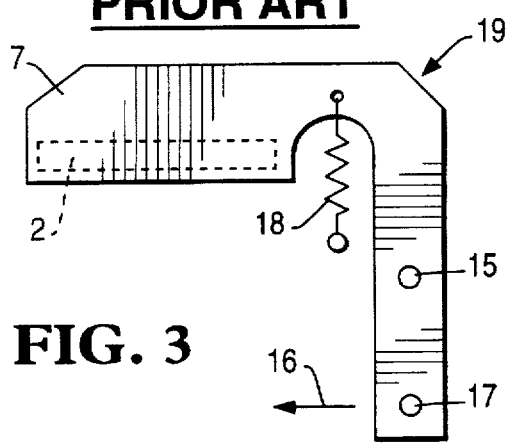
FIGS. 3 and 4 shows a prior art semaphore shutter viewed parallel to its pivotal axis in respectively closed and open positions.
Figure 4:
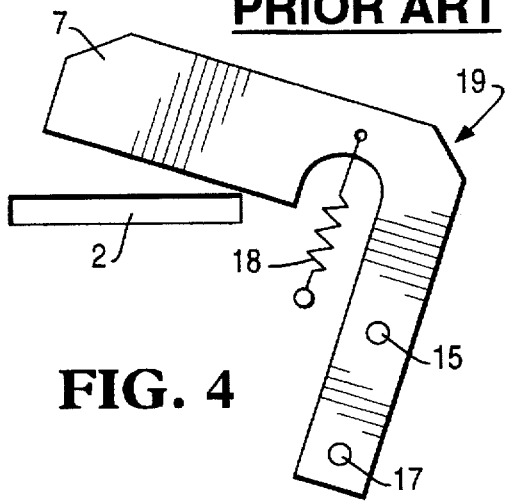

Referring now to FIG. 3 and 4, which show a prior art shutter mechanism, the shutter blade 7 of a shutter 19 closes (FIG. 3) or opens (FIG. 4) the entry aperture, such as the slot 2 of the ATM 1 of FIG. 1. The shutter 19 is opened by clockwise rotation about a pivot axis 15, on which the shutter 19 is pivotally mounted, by a driving force, such as an electromagnetic device, represented by arrow 16 applied at a drive mounting 17, against the anticlockwise bias of a spring 18 tending to close the shutter. Considerable energy is employed to open the shutter, and its closure may be unnecessarily powerful, due to the strength of the spring 18.

Figure 5:
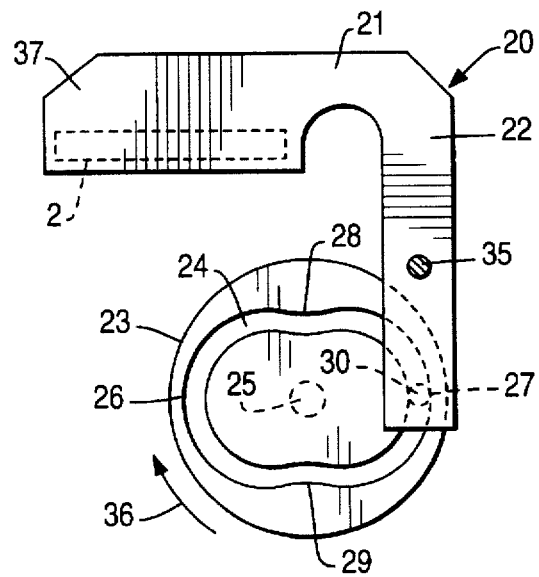
FIGS. 5 and 6 show a shutter and cam wheel embodying the invention viewed similarly and in respective similar positions to the prior art system of FIGS. 3 and 4.
Figure 6:
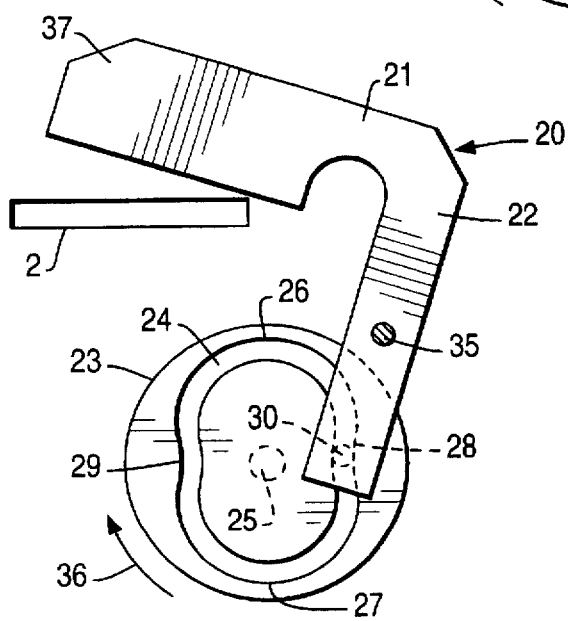
Figure 7:
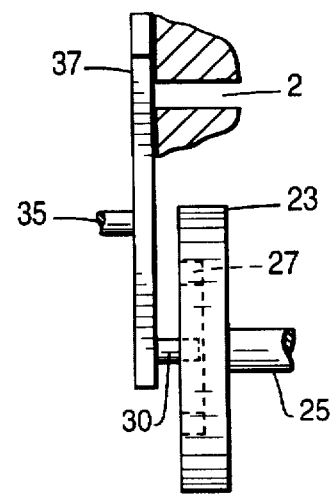
FIG. 7 is a side view of the shutter shown in FIGS. 5 and 6 in the closed position shown in FIG. 5.

Referring to the embodiment of the invention shown in FIGS. 5,6 and 7, a shutter 20 has a first arm 21 providing a shutter blade 37 and a second arm 22, perpendicular to the first arm 21, which is pivotally mounted on a shaft 35. The shutter blade 37 closes or opens the entry aperture slot 2 of the ATM 1 of FIG. 1. Thus far the shutter resembles the known shutter of FIGS. 3 and 4, but the opening and closing mechanism is different and a bias spring is not needed, although in a modification, a weak bias spring may be provided, to obviate the effects of wear and backlash.

The opening and closing mechanism comprises a cam wheel 23 rotatable clockwise as shown by the arrow 36, and carrying a double acting cam surface in the form of a groove track 24 shaped in a elongated closed loop. The cam wheel 23 is fixedly mounted on a drive shaft 25, which forms an axis of rotation for the cam wheel. The groove track 24 has two locations 26,27 which are relatively distant form the drive shaft 25 and two locations 28,29 which form re-entrant or depressed regions nearer the drive shaft 25. A drive pin 30 on the shutter arm 22 is located in the groove track 24 and this follows the track between one of the distant locations 26,27 and one of the form rentrant or depressed regions nearer locations 28,29, for opening the shutter 20, causing the shutter 20 to pivot about the shaft 35. This is illustrated in FIG. 5 which shows the shutter drive pin 30 in the distant location 27 of the groove track 24 thus locking the shutter 20 shut, with the entry aperture 2 closed by the shutter blade 37.

When the cam wheel 23 has rotated through approximately 90 degrees, in the direction of the arrow 36, the shutter mechanism will have adopted the position seen in FIG. 6, where the pin 30 is in the near location 28 of the cam groove track 24, and the shutter 20 has rotated clockwise so that the blade 37 no longer obstructs the aperture 2. A subsequent further clockwise movement of the cam wheel 23 will rotate the shutter 20 anticlockwise until the aperture 2 is again closed. The distant location 26 with respect to the drive shaft 25 will now be engaging the pin 30. FIG. 7 shows more clearly the shaft 35 and pin 30 in a side view of the shutter closed condition of FIG. 5.

It will be appreciated that the shutter mechanism could be arranged so that the distant locations 26,27 of the groove 24 could drive the cam 23 into the shutter open position and the near locations 28,29 would then bring the shutter into the closed position. Also, the shutter need not have the form of two arms at right angles, provided that the blade 37, the pivot 35 and the drive pin 30 are spaced from one another on the shutter 20, such that the shutter and groove track geometries allow the necessary movements to open and close the shutter. As mentioned, there may be a small bias spring (not shown) providing a closing bias on the shutter, to counteract wear and backlash. It should be understood that these effects are in fact minimized by the preferred arrangement since the cam is always driven in the same direction. It will be appreciated that the shutter 20 is always positively locked, whether open or shut, without expenditure of power.

What is claimed is:

1. A shutter mechanism comprising:

a support;

a shutter pivotably mounted on the support and including (i) a pin and (ii) a blade portion which is movable between a closed position which covers an aperture through which a data card may pass and an open position which uncovers the aperture; and a rotatable cam wheel having an axis of rotation and a cam groove track in which the pin of the shutter engages, the cam groove track having extreme near locations and extreme distant locations relative to the axis of rotation of the cam wheel such that movement of the pin in the cam groove track causes the shutter to pivot about the support to move the blade portion between the closed and open positions.

2. A shutter mechanism according to claim 1, wherein the shutter includes (i) a first arm comprising the blade portion and (ii) a second arm which is inclined relative to the first arm, the shutter pin and the support being located at spaced locations on the second arm.

3. A shutter mechanism according to claim 1, wherein the cam groove track has the form of a closed elongated loop having two near locations and two distant locations relative to the cam axis and providing two open and two closed positions of the blade portion of the shutter per revolution of the cam wheel.

4. A shutter mechanism according to claim 1, wherein the cam wheel is rotatable in one direction only.

5. A shutter mechanism according to claim 1, further comprising a bias spring for biasing the blade portion of the shutter towards the closed position.

* * * * *